United States Patent [19]

Beckert et al.

[11] 4,014,732

[45] Mar. 29, 1977

[54] DEVICE FOR DRYING AND SETTING THE ADHESIVE ON BACKS OF BOOKS

[75] Inventors: Alexander Beckert, Vienna, Austria; Karl-Heinz Knobbe, Ellerbeck, Germany

[73] Assignee: Firma Mohndruck, Reinhard Mohn oHG, Gutersloh, Germany

[22] Filed: May 29, 1975

[21] Appl. No.: 581,616

[30] Foreign Application Priority Data

June 1, 1974 Germany .......................... 2426704
Nov. 29, 1975 Germany .......................... 2553816

[52] U.S. Cl. ...................................... 156/380; 34/1; 156/274; 156/477 B; 219/10.53; 219/10.71

[51] Int. Cl.² .......................................... B29C 19/02

[58] Field of Search ... 156/477 R, 477 B, 272–274, 156/380; 34/1; 219/10.71, 10.81

[56] References Cited

UNITED STATES PATENTS

| | | | |
|---|---|---|---|
| 2,642,000 | 6/1953 | Wieking | 34/1 X |
| 2,706,165 | 4/1955 | Korsgaard | 156/274 |
| 2,824,383 | 2/1958 | Machalek | 34/1 X |
| 2,968,336 | 1/1961 | Martin et al. | 156/477 B X |
| 3,085,265 | 4/1963 | Biel et al. | 156/477 B |
| 3,149,217 | 9/1964 | Reed et al. | 156/477 B |
| 3,223,436 | 12/1965 | Becker | 156/477 B |
| 3,340,125 | 9/1967 | Drenning et al. | 156/274 |
| 3,484,179 | 12/1969 | Adams et al. | 34/1 X |
| 3,537,185 | 11/1970 | Ingram | 34/1 |

*Primary Examiner*—David A. Simmons
*Attorney, Agent, or Firm*—Allison C. Collard

[57] ABSTRACT

A device for drying and setting of backing adhesive material applied to backs of books comprising a feeder adjacent a book binding machine including a conveyor belt on which the back of the books are disposed and a gripper for holding the books in a feeding and clamping range. A plurality of HF-electrodes are positioned opposite to the backs of the book blocks and laterally with respect to a longitudinal axis relative to the conveyor belt, the electrodes being mounted in the feeding and clamping range for the gripper adjacent to the book binding machine. An exhaust is provided which removes evaporation leaving said backing adhesive material.

9 Claims, 15 Drawing Figures

1
2
3
4
5
13
18
19
20
21
22
23
24
25
II

DEVICE FOR DRYING AND SETTING THE ADHESIVE ON BACKS OF BOOKS

The present invention relates to a device for the drying and setting of adhesive on backs of books, in particular, the backing adhesive material which is applied to the backs of books.

When making books, the individual pages of a book are mechanically and sometimes manually assembled into a book block. Thereafter, this book block is gripped by gripping means of a book binding machine, so that the individual pages are not displaced with respect to each other. In the subsequent continuous operation of the book binding machine, the back of the book is then milled, provided with a layer of adhesive, and subsequently a paper or gauze strip is pressed against the back of the book. Sometimes when catalogues are bound, an envelope type material is used, so that the backing adhering material, as it is commonly called in the trade, i.e., the strips of gauze, paper or envelopes, adhere firmly to the backing of the book.

It is apparent that the adherence of this material on the backing of the book is still relatively weak, since the adhesive has not set. The setting of the adhesive is carried out, as generally known, by evaporating the moisture contained in the adhesive, so that one can say that the adhesive has to be dry for obtaining a rigid connection between the backing adhesive material and the back of the books.

Only when the rigid connection has been obtained after the adhesive is set, the book block may be subjected to further manufacturing processes, for example, the trimming of the fold extensions in a so-called three knife trimmer.

In practice, it has been shown that the drying of the adhesive with respect to the remainder of the manufacturing operational speed of the known book binding machines takes too long, so that a number of devices are known to accelerate the setting of the adhesive. Almost all of these devices are similar in that they are all switched in series with respect to the book binding machines and cannot be considered as an integral part of the book binding machine. Therefore, the book blocks must be removed from the feeding device and fed to the drying station.

In the known drying devices for setting the adhesive, a number of heat sources are known in order to accelerate the rate of evaporation of moisture in the adhesive, for example, microwaves, hot air blowers or infrared beams. It also had been suggested to accelerate the drying process by subjecting the book block backs to a high frequency voltage field which is created by high frequency electrodes. Hence, the shortening of the drying period is subject to certain limitations. This is caused by a distortion or corrugation of the back of the book due to accelerated removal of the moisture from the adhesive which then penetrates into the back of the book, or by a bubble formation of the adhesive which results in an uneven adherence of the backing adhesive material onto the back of the book block.

For the above-mentioned reasons, the known drying devices are relatively large and require a lot of valuable factory space, since the books which exit from the book binding machine are released at a certain interval which does not coincide with the speed of the drying device, so that a back-up situation is created which is caused by the drying device and has to be somehow absorbed by the same.

Besides the fact that the known devices may accelerate the drying of the adhesive, there is still the disadvantageous ratio of speed between the known book binding machines and the drying device. However, the even greater disadvantage is that the books must be removed from the feeding means of the book binding machine and moved to the drying device which requires additional operators and therefore increased costs, and in that the quality of the books may suffer because at the time of removal of the books from the transport gripping means, the adhesive is still "wet" which may lead to a displacement of the individual pages or to the partial or complete removal of the backing adhesive material from the backs of the books. Therefore, the books are often pushed against a table plate in order to return the books to their desired correct form or position.

In order to prevent these disadvantages, a device for drying the adhesive was suggested, wherein the books, are held in a flat band chain pair for clamping and feeding the books, whereby within the total clamping and feedng range, an adhesive applying means and the clamping stations are arranged in series with respect to each other, and wherein the drying station consists of short wave infrared beams which are directed onto the backs of the books and are installed at a low distance, that is, 20mm away from the books.

With these devices, it is to be attempted to dry the book backs during the time they are positioned on the flat band chain.

However, for various reasons, the desired success cannot be obtained. First of all, it is almost impossible to move the chain plates at the absolute same speed at all times, so that the book which is held between two plates is disturbed due to the uneven movement of the chains. If the drying and setting of the adhesive is carried out at this point, there is absolutely no possibility to see to it that the books have the original desired shape.

Furthermore, the desired success cannot be obtained because when using the short wave infrared beams by means of a direct application, the lower side of the adhesive layer is first dried and then gradually the complete drying of the adhesive layer takes place.

Furthermore, the use of the infrared beam causes a dangerous heating of the book pages, so that the paper may be damaged, for example, it may become corrugated due to the moisture which is removed from the adhesive which may be an irreversible situation.

It is therefore an object of the present invention to provide a device comprising a plurality of high frequency electrodes which are positioned opposite to the book backs and laterally with respect to the longitudinal axis behind a feeding band on which the other side of the backs of the books are mounted, the electrodes being mounted in the feeding and clamping range for the gripper of the feeder adjacent to a book binding machine, and that the device is provided with an exhaust means for the high frequency electrodes.

The advantages obtained with the inventive device can be seen that the drying of the adhesive now takes place in the range where the books are still held by the gripper of the feeder. Therefore, a displacement of the individual pages of the book is eliminated, so that a quality formed book leaves the drying station with the backing adhesive material securely connected with the back of the books. The books will now be fed to further manufacturing stations, whereat the drying of the books is carried out at the same speed of the operating speed of the book binding machine.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views.

Figure 1:
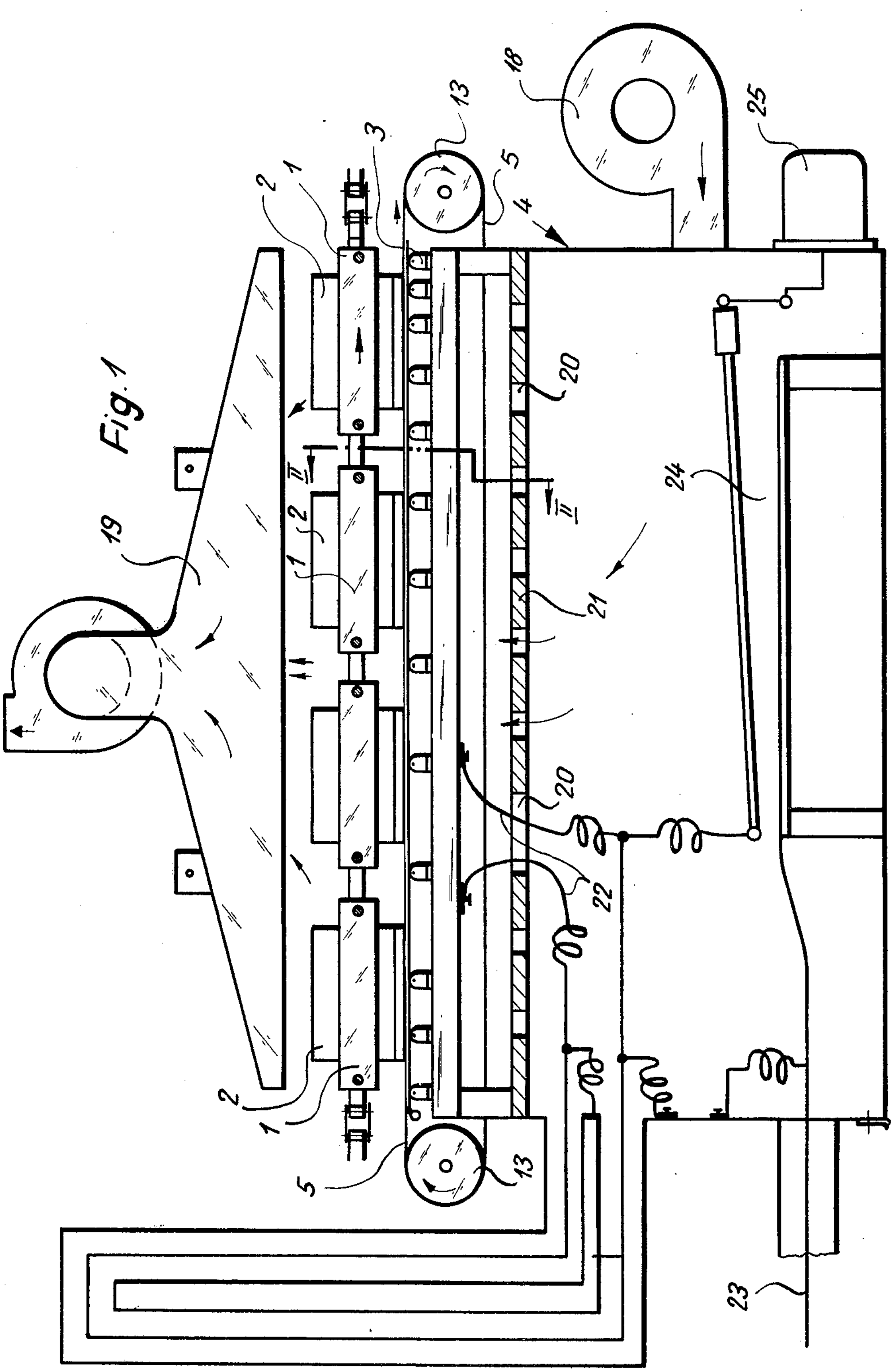
FIG. 1 is a schematic side view of the structure of the inventive device.

The inventive device as shown in FIG. 1 is a part of a well-known book binding machine which is not shown. The inventive drying station of the invention is the last station of a known book binding machine. In known manner, the book binding machine is provided with feeding grippers 1 when the books 2 are held, so that the books may be milled, glued and attached with a strip of paper, gauze or the like, while the books run through the book binding machine. The books are then dried in the device in accordance with the invention.

For the purpose of drying the adhesive layer, the inventive device is provided with so-called high frequency electrodes 3, the following being called HF-electrodes for short. These HF-electrodes are positioned such that the back of the books 2 which are provided with the adhesive layer, are fed through the HF-field created by the HF-electrodes 3, so that the drying of the adhesive layer is carried out, i.e., the evaporation of the moisture contents in the adhesive layer is removed. These so-called HF-driers are well known, so that it is not necessary to go into a detailed discussion about the function and operation thereof. The HF-electrodes 3 are mounted on a frame 4 which is provided with a conveyor belt 5 which runs above the HF-electrodes 3 and whereby the book blocks 2 are supported on the conveyor belt 5. Between the conveyor belt 5 and the HF-electrodes 3, there is provided a stationary insulating layer 6, which is made of a material having a low friction coefficient with the conveyor belt 5. Thereby, a constant mechanical stress on the electrodes 3 is prevented.

Figure 2:
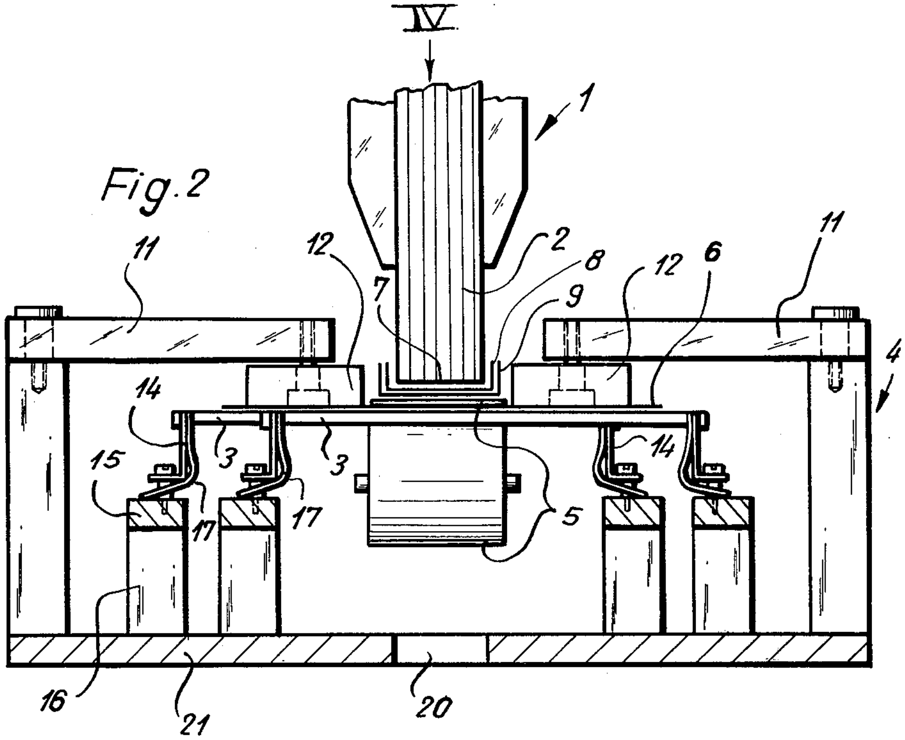
FIG. 2 is a section taken along the lines II—II in FIG. 1.

As can be seen from FIG. 2, an adhesive layer 8 is applied on the back 7 of book 2 with which a backing adhesive material 9 is bonded to the books 2. This backing adhesive material 9 may consist of different materials, for example, paper, gauze or carton. Since this material is not only to be applied to the back 7 of the books 2, but is also to be bonded to the adjacent area of the book, a pressure lever 11 is provided with associated pressure springs 10 and a pressure roller 12, so that a pressure force is applied on the entire range of the material 9. The conveyor belt 5 which runs over the two transport rollers 13, runs with the same speed as do the gripper means 1, so that a relative movement between the book blocks 2 and the conveyor belt 5 does not take place.

The HF-electrodes 3 are mounted on electrode supports 15 by means of electrode fasteners 14, the electrode supports being mounted on insulators 16. The electrodes 3 are pushed upwardly by a spring 17 against the backs 7 of the book blocks, whereby the insulation layer 6, as well as the conveyor belt 5, prevent a direct contact of the electrodes 3 and the backing adhesive material 9.

The HF-electrodes 3 create a high frequency field through which the books are guided, whereby the high frequency field permits a very rapid drying, i.e., there is obtained an evaporation of the moisture in the adhesive material. The power of the HF-electrodes 3 is such that a complete drying and a complete setting of the adhesive layer 8 is achieved in a time period in which the book block 2 moves through the drying device of the invention. The speed of the books is equal to the operational speed of the book binding machine of which the drying device is an integral part, since the gripper means 1, wherein the book blocks 2 are held, pass through the total book binding machine, including the drying device. Since this operational speed of the book binding machine is rather high, the removal of the moisture from the adhesive layer 8 must be carried out rapidly in the drying device. For this purpose, the already mentioned high power of the electrodes 3 is required and, on the other hand, the squeezing-out of the backing adhesive material 9 at the backs 7 of the books 2, so that an eventual formation of bubbles in the adhesive layer is prevented. A further, rather essential requirement of the inventive device is the provision of an air exhaust system, so as to keep up with the enormous drying speed. In the embodiment shown in FIG. 1, such an exhaust system is shown, essentially comprising a blower 18, which is mounted below the conveyor belt 5, and an exhaust means 19, which is positioned above the conveyor belt 5, on which the blocks of books 2 are moved.

The frame 4 is essentially formed by a closed housing, which at its upper portion is provided with a base plate 21 having a plurality of apertures 20, so that the air from blower 18 may enter through base plate 21. This housing construction also permits one to install feeder lines 22 from the inside of the housing 4 and to the HF-electrodes 3.

The air exhaust which comprises a blower 18 and an exhaust 19 is necessary because, due to the high power of the HF-electrodes 3, evaporation already starts in the first section of conveyor belt 5. This relatively high amount of evaporation is released as a result of the short rest duration. The evaporation vapor has to be removed immediately, so that a penetration of water vapor into book 2 is absolutely prevented, since otherwise the individual pages of the book 2 would distort, which would result in a poor book quality.

Figure 3:
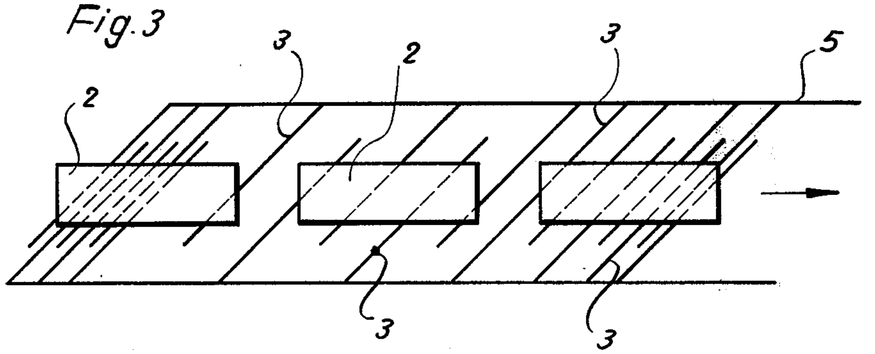
FIG. 3 is a schematic top plan view of one possible arrangement for the high frequency electrodes.
Figure 4:
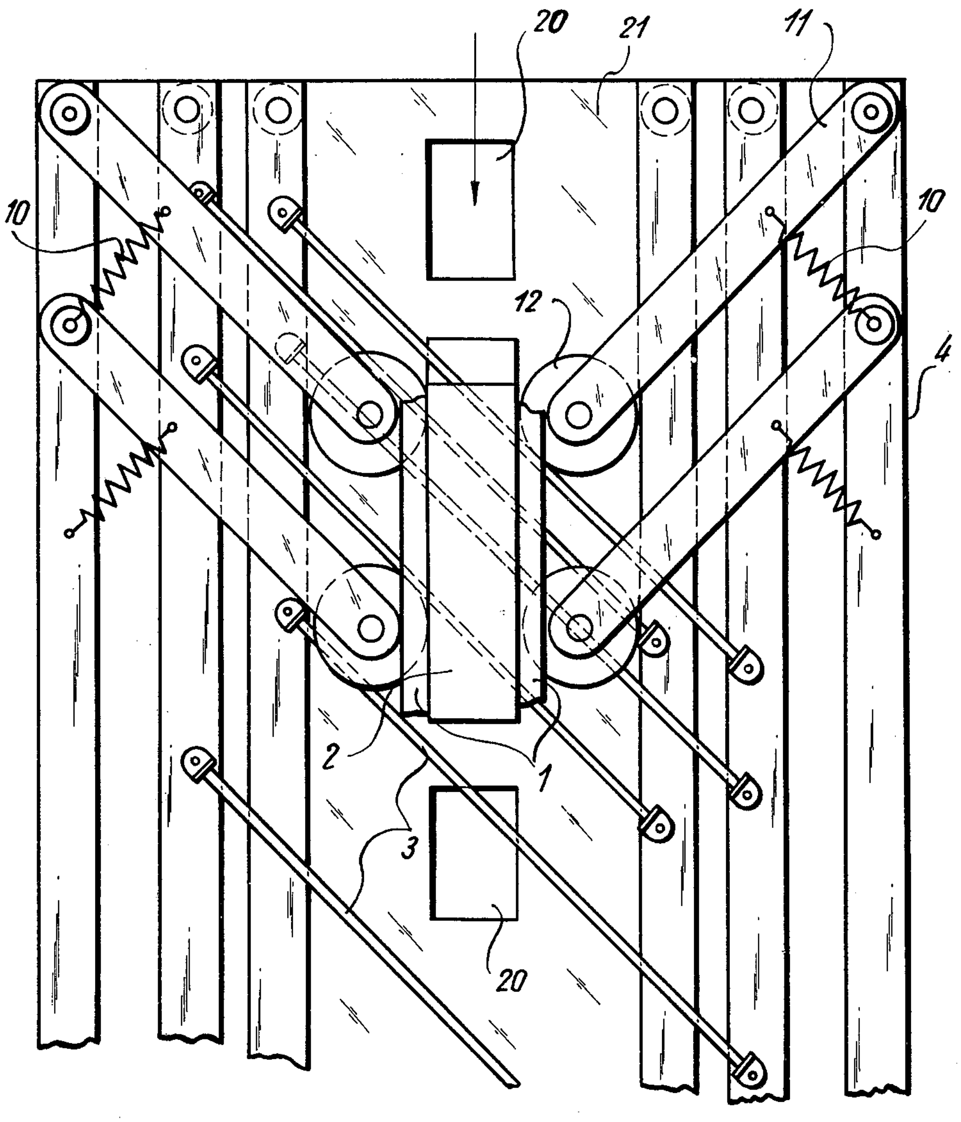
FIG. 4 is a view taken in the direction of the arrow IV in FIG. 2.
Figure 5:
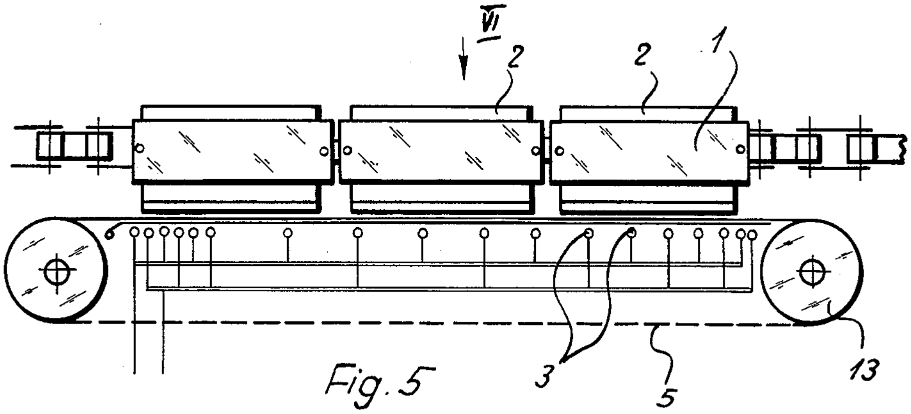
FIG. 5 is a schematical side view of the gripper means and the conveyor means of the inventive device.
Figure 6:
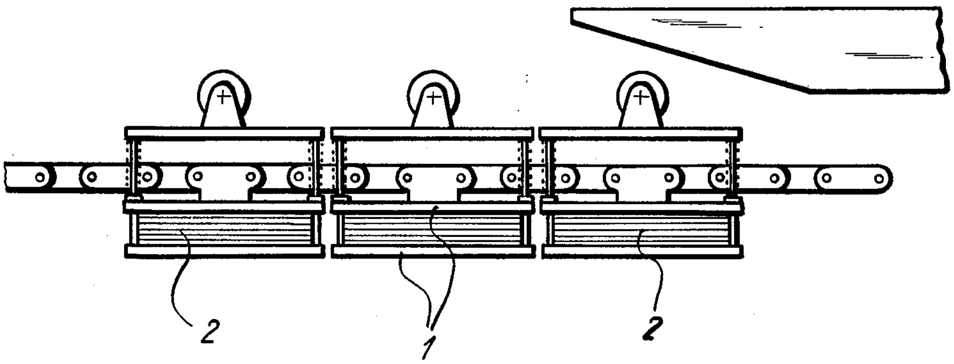
FIG. 6 is a view in the direction of the arrow VI of FIG. 5.
Figure 7:
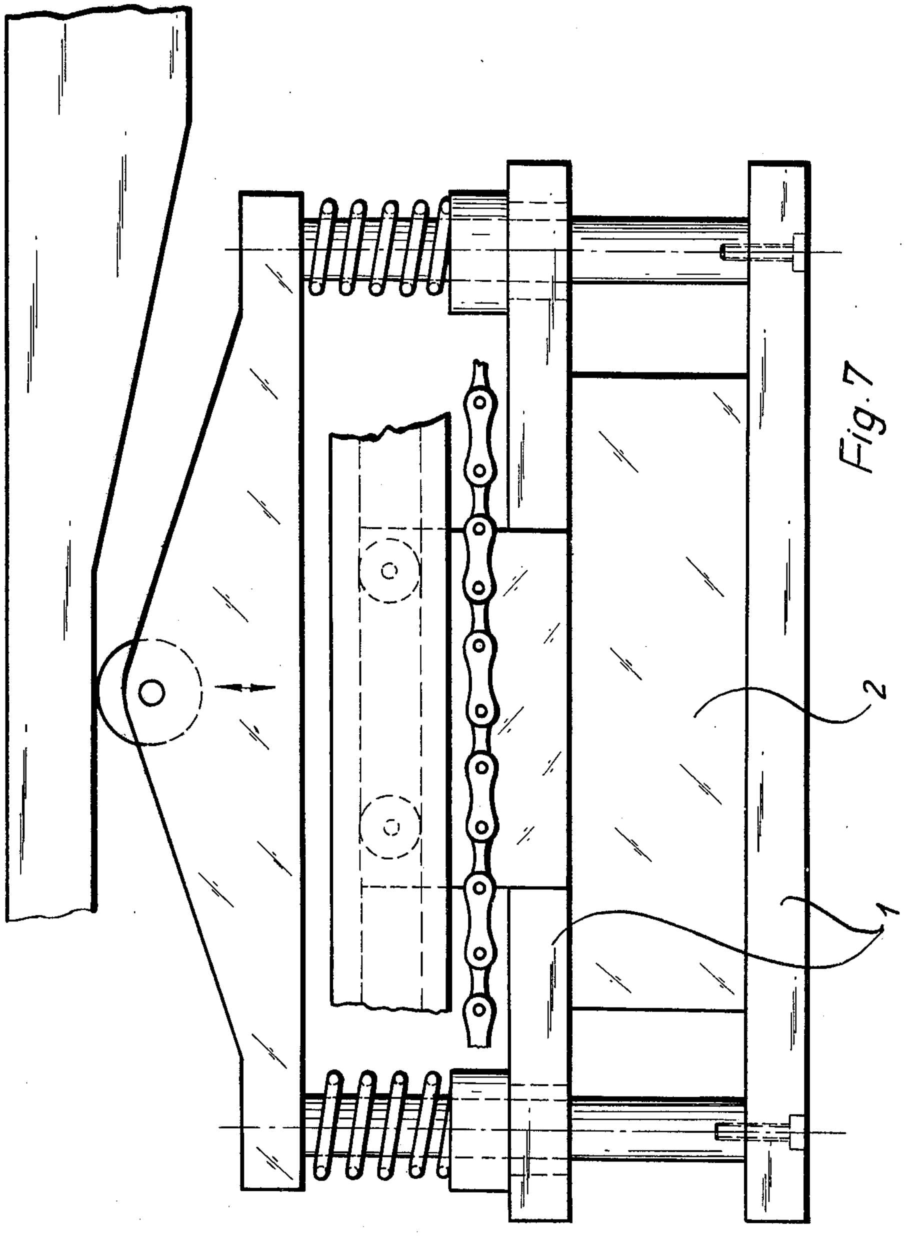
FIG. 7 is a plan view of a book held by the feeding gripper.
Figure 8:
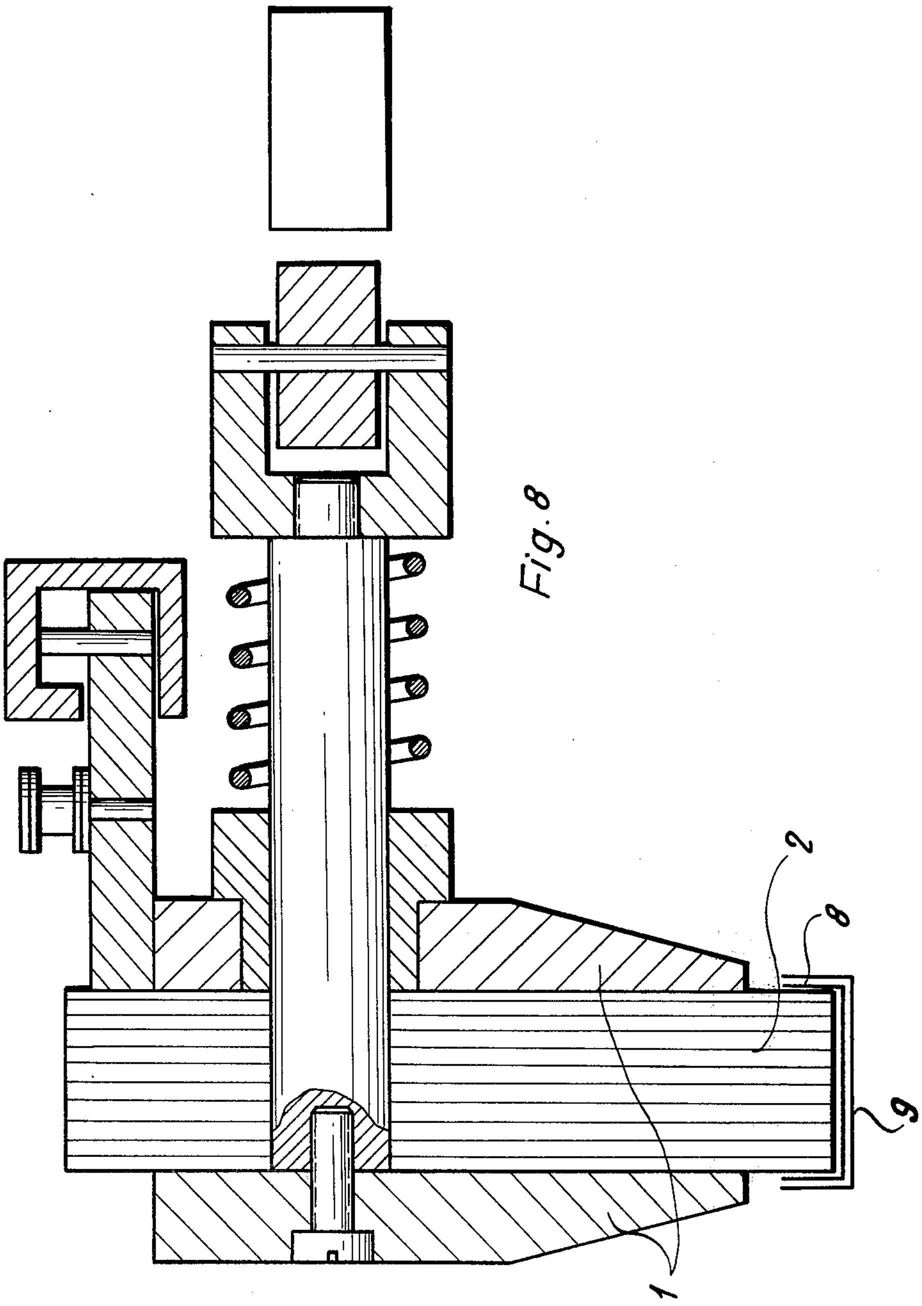
FIG. 8 is a vertical sectional view through a feeder with a book held in position.
Figure 9:
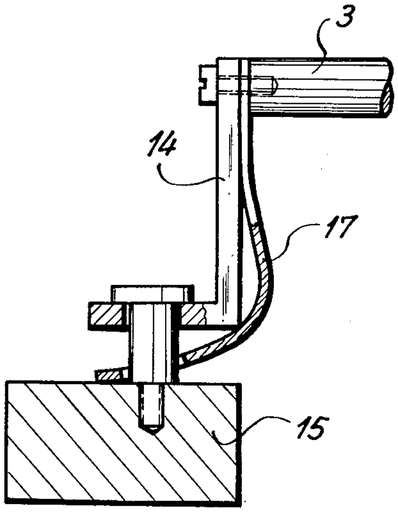
FIG. 9 and 11 are detailed partial sectional views of the mounting of the high frequency electrodes.

As can be seen from FIG. 3, the HF-electrodes 3 are positioned obliquely with respect to the feeding direction of the book 2, whereby the HF-electrodes 3 are arranged at different longitudinal distances with respect to each other, along the total length of the conveyor belt 5. At the starting range, the electrodes are spaced closer together, while the electrodes are spaced farther apart from each other at the center range of the conveyor belt, and further are spaced closer together at the end of the conveyor, so that when books 2 enter the drying device, a sudden heating of the adhesive layer 8 occurs. During the further movement of the books 2, this temperature is maintained, and before leaving the drying device, the heat is increased again, so as to make sure that all the remaining moisture has been removed from the adhesive layer 8. This procedure assures that the back adhesive material 9 is fixedly connected with the back of the books, since the adhesive layer is completely dried and set, which permits an immediate further manufacturing step with the books. This procedure eliminates interruptions in the operating process during the manufacturing which is rather time saving.

Furthermore, a very substantial advantage is obtained with the present invention in that the books which leave the drying station have a shape which is expected from a high quality book. This is achieved in that the drying and setting of the adhesive layer 8 is carried out while the book is still held in position by the gripper means, which prevents a displacement of the book 2 with respect to the back adhesive material 9.

Figure 10:
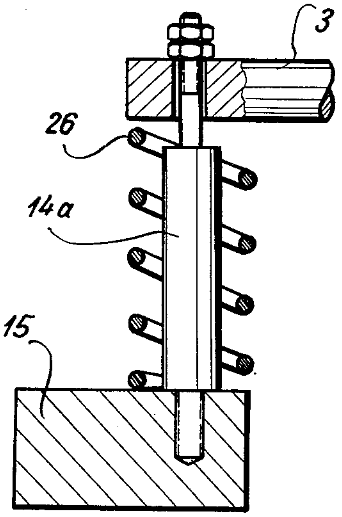
FIG. 10 is a perspective view of a detail of the mounting of the high frequency electrodes.
Figure 11:
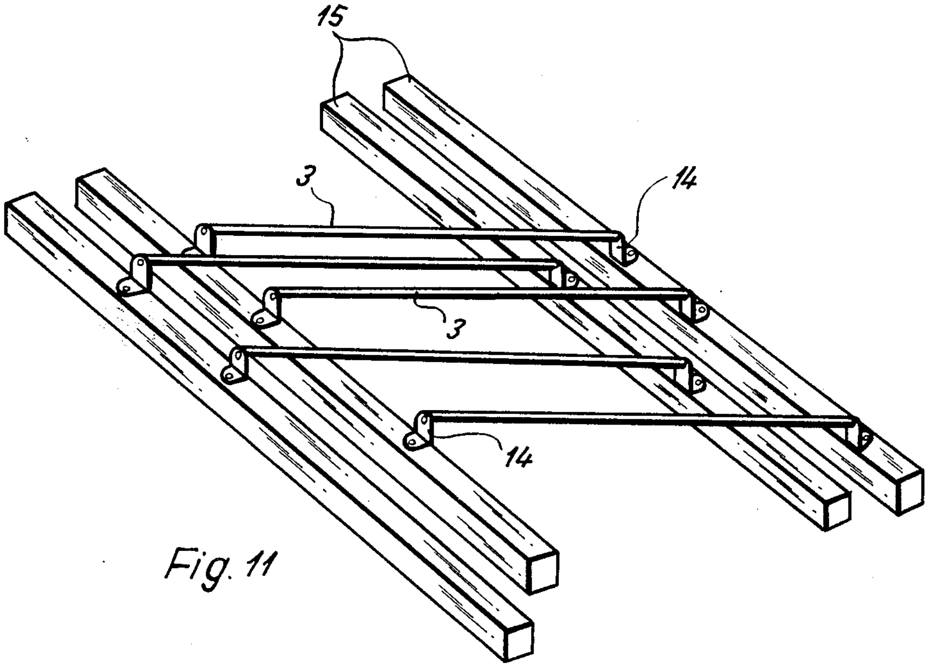

As can be seen in FIG. 1, the required and well-known elements for creating the high frequency field are installed in the frame 4, for example, a feeder cable 23, a condenser 24 and the actual output control 25. Naturally, the structure shown in FIGS. 1 and 3 may be varied with the drying device in accordance with the invention. For example, FIG. 10 shows that the spring or resilient mounting or bearing for the HF-electrodes 3 can be obtained in a manner where a cylindrical electrode fastener 14*a* is screwed into electrode support 15, and the cylindrical electrode fastener 14*a* is encompassed by a pressure spring 26 which engages the HF-electrodes 3. FIG. 11 shows that the spring effective bearing for the HF-electrodes may be eliminated completely and may be directly mounted at the electrode fasteners 14*a* onto the electrode support 15.

Figure 12:
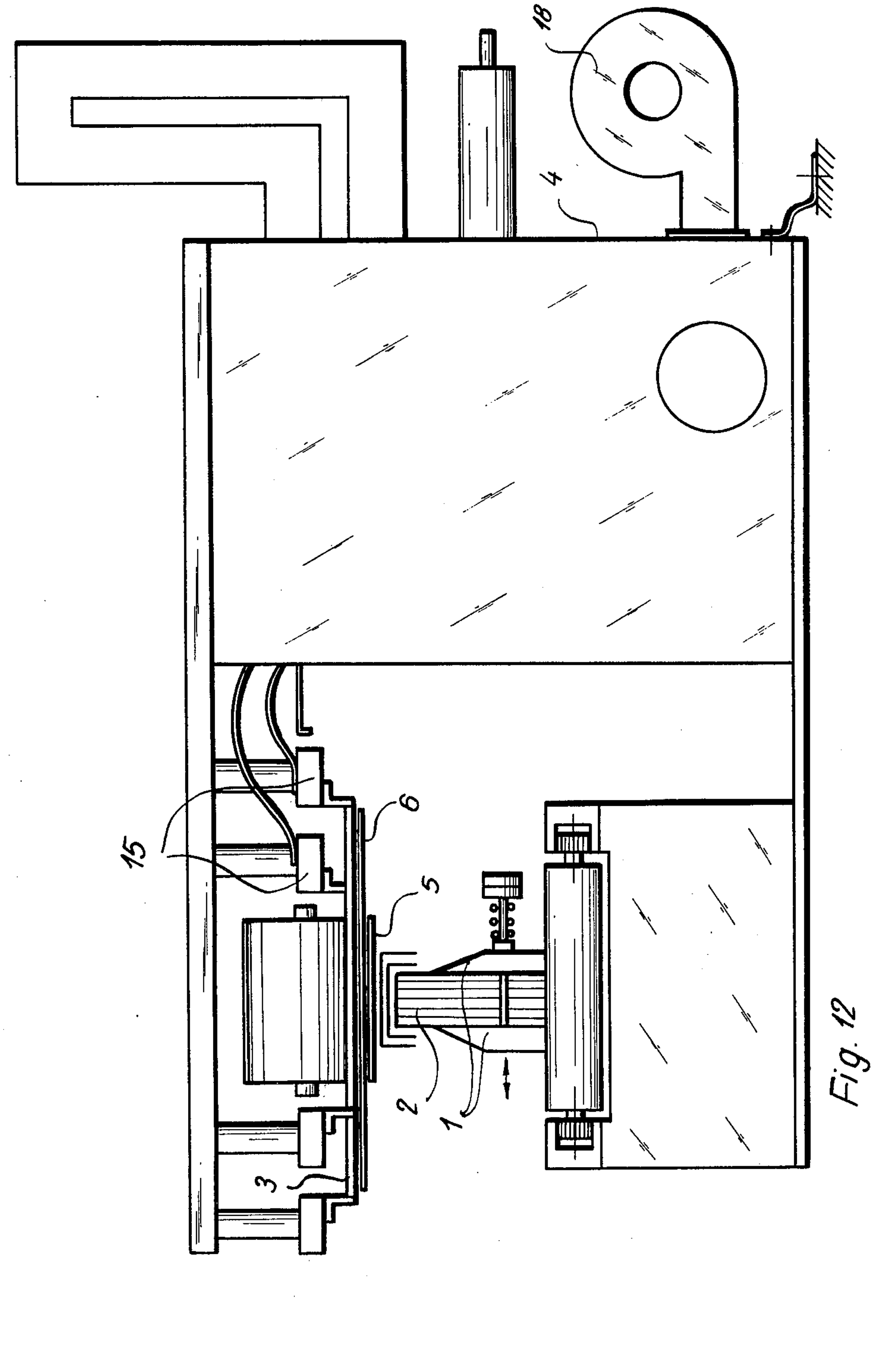
FIG. 12 is an elevational view of a further embodiment of the invention.

FIG. 12 shows one embodiment of the invention wherein the book blocks 2 are fed at the lower side of conveyor belt 5 and held in position by the gripper means 1. Obviously, this is indeed a reversed process to that of the one shown in accordance with FIGS. 1 and 2.

Figure 13:
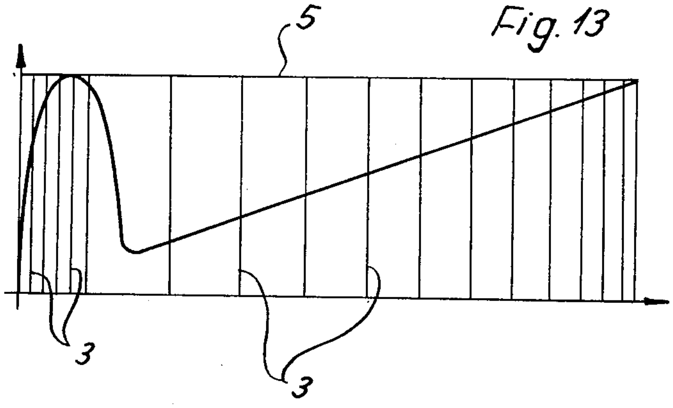
FIG. 13 is a high frequency power diagram.
Figure 14:
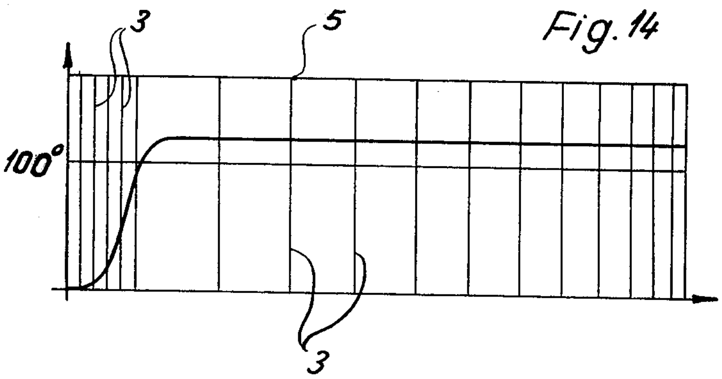
FIG. 14 is a diagram which shows the feeding path.
Figure 15:
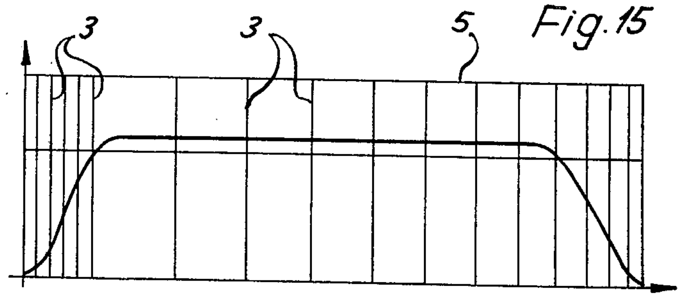
FIG. 15 is a diagram of the evaporation curve.

FIGS. 13–15 show the distribution of the HF-power along the length of the conveyor belt 5, the temperature path which is the result of this power distribution and finally the resulting evaporation curve, in that order. Thereby, the positionings of the HF-electrodes 3 is shown, which at the beginning are rather spaced closely together; in the center range they are spaced farther apart; and at the end of the conveyor belt 5, the electrodes are again closer together. This arrangement results in the fact, as can be seen in FIG. 14, that the adhesive layer is rapidly heated, so that in a relatively short time period, the temperature exceeds 100° C, and that this temperature is maintained over the total range of the conveyor belt. From this temperature distribution, it can be seen that at the starting range of the conveyor belt, a very sharp increase of the evaporation curve is obtained, that an even evaporation takes place over the total center range, and that a total removal of moisture from the adhesive layer takes place at the end of the conveyor belt 5.

While several embodiments of the present invention have been shown and described, it will be obvious to those skilled in the art that many changes and modifications may be made thereunto without departing from the spirit and scope of the invention.

What is claimed is:

1. A device for drying and setting of adhesive on backs of book blocks, in particular of backing adhesive material applied to backs of books, comprising:

a book binding machine including adjacent thereto a feeding means including a conveyor belt on which said backs of said books are disposed and a gripper means for holding said books in a feeding and clamping range;

a plurality of HF-electrodes positioned opposite to said backs of the book blocks and laterally with respect to a longitudinal axis relative to and under said conveyor belt, said electrodes being mounted in said feeding and clamping range for said gripper means of said feeding means adjacent to said book binding machine, said HF-electrodes being spaced apart at different distances with respect to each other, the distance of the electrodes with respect to each other is substantially close together at a starting range of said conveyor belt, said HF-electrodes being spaced farther apart at a center range of said conveyor belt, and said HF-electrodes being spaced close with respect to each other in a spacing which substantially corresponds to their distance spacing at said starting range of said conveyor belt at an end of the conveyor belt; and an exhaust means for removing evaporation leaving said backing adhesive material.

2. The device according to claim 1 wherein said HF-electrodes are spring mounted.

3. The device according to claim 1 further comprising:

pressure levers including associated pressure roller means thereon for exerting pressure in a range of said backs of said book blocks; and springs operatively connected to and biasing said levers.

4. The device according to claim 1 wherein said exhaust means comprises a blower positioned beneath said HF-electrodes; and an exhaust positioned above said HF-electrodes.

5. The device according to claim 1 wherein said HF-electrodes are positioned obliquely with respect to said gripper means.

6. The device according to claim 1 further comprising:

a stationary insulating layer disposed between said conveyor belt and said HF-electrodes.

7. The device according to claim 6 wherein said insulating layer comprises a material having a low friction coefficient with said conveyor belt.

8. The device according to claim 1 wherein the speed of said conveyor belt corresponds to the speed of said gripper means.

9. The device according to claim 1 further comprising:

a substantially closed frame having an upper base plate with a plurality of apertures;

insulators are mounted on said upper base plate; and electrode support means disposed in said insulators for mounting said HF-electrodes on an upper side of said base plate.

* * * * *